United States Patent
Kai (10) Patent No.: US 7,287,270 B2
(45) Date of Patent: Oct. 23, 2007

(54) USER AUTHENTICATION METHOD IN NETWORK

(75) Inventor: Akinori Kai, Kyoto (JP)

(73) Assignee: ARKRAY, Inc., Kyoto (JP)

(*) Notice: Subject to any disclaimer, the term of this patent is extended or adjusted under 35 U.S.C. 154(b) by 694 days.

(21) Appl. No.: 10/415,388

(22) PCT Filed: Oct. 30, 2001

(86) PCT No.: PCT/JP01/09500

§ 371 (c)(1),
(2), (4) Date: Jul. 28, 2003

(87) PCT Pub. No.: WO02/37358

PCT Pub. Date: May 10, 2002

(65) Prior Publication Data

US 2004/0030935 A1    Feb. 12, 2004

(30) Foreign Application Priority Data

Oct. 31, 2000  (JP) ............................ 2000-372129
Oct. 31, 2000  (JP) ............................ 2000-372130
Oct. 31, 2000  (JP) ............................ 2000-372131

(51) Int. Cl.
*G06F 17/30* (2006.01)

(52) U.S. Cl. ............ 726/2; 726/3; 726/9; 726/10; 726/21; 713/155; 713/161; 713/168; 713/169; 713/170; 713/176; 380/229; 380/232; 380/247; 705/44; 705/67

(58) Field of Classification Search .......... 726/9, 726/10, 21, 2, 3; 455/411; 713/155, 161, 713/168–169, 170, 176; 380/229, 232, 247; 705/44, 67; 709/223, 227
See application file for complete search history.

(56) References Cited

U.S. PATENT DOCUMENTS 5,249,230 A * 9/1993 Mihm, Jr. ............... 380/249
5,465,290 A * 11/1995 Hampton et al. ........ 379/88.02
5,473,689 A * 12/1995 Eberhard ................. 713/169
5,922,074 A * 7/1999 Richard et al. .......... 726/21

(Continued)

FOREIGN PATENT DOCUMENTS

JP    8-294173    11/1996

(Continued)

*Primary Examiner*—Kim Vu
*Assistant Examiner*—Baotran To
(74) *Attorney, Agent, or Firm*—Hamre, Schumann, Mueller & Larson, P.C.

(57) ABSTRACT

When a network connection request is sent from a user's personal computer (2) to a server (1) on the Internet (5), the server (1) sends an authentication confirmation number generated by a random number generating unit (13) to the personal computer (2) of the connection requester. The connection requester connects a portable telephone (3) to a modem (4) and enters the authentication confirmation number displayed on the personal computer (2) through operation of keys of the portable telephone (3). An authentication unit (16) authenticates the connection request of the connection requester to set up connection to the network if the telephone number of the portable telephone (3) stored in a user information storage unit (12) agrees with the telephone number sent to the modem (4) and if the authentication confirmation number entered through the portable telephone (3) is correct.

8 Claims, 8 Drawing Sheets

U.S. PATENT DOCUMENTS

| | | | |
|---|---|---|---|
| 6,072,875 A * | 6/2000 | Tsudik | 455/433 |
| 6,151,676 A * | 11/2000 | Cuccia et al. | 713/176 |
| 6,192,405 B1 * | 2/2001 | Bunnell | 709/225 |
| 6,240,517 B1 * | 5/2001 | Nishioka | 726/20 |
| 6,430,407 B1 * | 8/2002 | Turtiainen | 455/411 |
| 6,577,733 B1 * | 6/2003 | Charrin | 713/169 |
| 7,076,797 B2 * | 7/2006 | Loveland | 726/5 |
| 7,080,256 B1 * | 7/2006 | Vedder | 713/185 |
| 2003/0097567 A1 * | 5/2003 | Terao et al. | 713/176 |

FOREIGN PATENT DOCUMENTS

| | | | |
|---|---|---|---|
| JP | 9-27863 | | 1/1997 |
| JP | 11-338933 | * | 12/1999 |
| JP | 2000-59516 | | 2/2000 |
| JP | 2000-059516 | * | 2/2000 |
| JP | 2000-123100 | * | 4/2000 |
| JP | 2001-117981 | | 4/2001 |

* cited by examiner

User Number  ARK00750
Password  ******

Send

FIG. 3

Your confirmation number is  4756

Perform authentication procedure.

| Ordered merchandise | | | | | |
|---|---|---|---|---|---|
| Name of merchandise | Price | Number | Consumption tax | Total | Remark |
| Low calorie Japanese sweets Strained bean jam 8 pieces | 2,000 | 1 | 100 | 2,100 | |
| Sox B | 1,500 | 2 | 150 | 3,150 | |

To ordering screen

FIG. 8

Ordered merchandise

| Name of merchandise | Price | Number | Consumption tax | Total | Remark |
|---|---|---|---|---|---|
| Low calorie Japanese sweets Strained bean jam 8 pieces | 2,000 | 1 | 100 | 2,100 | |
| Sox B | 1,500 | 2 | 150 | 3,150 | |
| Total purchase price | | | | 5,250 | |

Please telephone the number below for confirmation of order and input your ID number for confirmation.

Telephone number 0120-×××-××××
ID number for confirmation 131510

F I G. 9

We received the following order.

| Name of merchandise | Price | Number | Consumption tax | Total | Remark |
|---|---|---|---|---|---|
| Low calorie Japanese sweets Strained bean jam 8 pieces | 2,000 | 1 | 100 | 2,100 | |
| Sox B | 1,500 | 2 | 150 | 3,150 | |

We charge you for merchandise together with telephone charge for sending confirmation ID.

USER AUTHENTICATION METHOD IN NETWORK

TECHNICAL FIELD

The present invention relates to a method for identifying and authenticating a user of a terminal when the terminal is connected to a network such as the Internet or an intranet.

BACKGROUND ART

When making a connection to the Internet, there is employed the following method (referred to as "a password method") in which a user contracts with the Internet service provider (referred to as a "provider," hereinafter) and determines a user number and a password in advance, and at the time of connecting, the user inputs the user number and the password. Thereby the provider identifies the user and authorizes connection to the Internet.

In a service of transferring money such as a bank transfer on the Internet, a method of identifying a user by the use of a random numbers table (referred to as "a random numbers table method") is performed. In this method, a user number and a password are determined between a user and a service providing institution such as a bank, and a random numbers table is given to the user by the service providing institution. When the user inputs the user number and password at the time of using the service, the user is requested to input a number in a box in the random numbers table by the service providing institution. When it is confirmed that the number input by the user agrees with the number in the random numbers table, the user can be provided with the service.

Furthermore, in connection to an intra-company LAN via the Internet, or connection to an intra-company LAN by a dial-up remote access such as ISDN etc. via a public line, an authentication method referred to as a one-time password method is employed. The user, who was given a password generating device from the service provider, inputs a user number and a password displayed on the password generating device. When the password input by the user agrees with the password in the server at the side of the service provider, the connection is authorized.

In the password method, the password determined between the service provider and the user is fixed and used many times. Therefore, if the user number and the password are known to the third person, there may be a problem of wrongdoing called "pretending" in which the third person pretends to be the user in person and makes a connection to the Internet illegally by using the user number and the password and receives various services.

In the random numbers table method or the one-time password method, although the safety of security is higher than the password method, a user always has to carry the random numbers table or password generating method, and therefore such methods are troublesome methods for the user.

DISCLOSURE OF THE INVENTION

It is an object of the present invention to provide a network system capable of authenticating a user easily and securely without requesting the user to use a special device or to do a complicated operation.

In order to achieve the above-mentioned object, a method for authenticating a user, by which a server device of a service provider authenticates a service user on a network includes a confirmation information issuing step including receiving an authentication request from a first communication device of the service user, and then generating a confirmation information to be replied to the first communication device; and an authentication step of judging whether or not the confirmation information replied to the first communication device agrees with the confirmation information sent from the service user by a second communication device using a communication path that is different from a communication path of the first communication device.

As the first communication device, a computer, etc. connected to the server device via the Internet can be used, and as the second communication device, a telephone, etc. can be used. Thus, without requiring the user to use a special device or to do a complicated operation, it is possible to provide a network system with a high security level, which can authenticate a user easily and reliably.

It is preferable that the method for authenticating a user further includes steps of obtaining first authentication requester information about a service user who makes the authentication request based on the information contained in the authentication request received from the first communication device; and obtaining second authentication requester information about the service user when receiving confirmation information from the second communication device and judging whether or not the first authentication requester information agrees with the second authentication requester information. According to this method, in addition to the check of the confirmation information, since the check of the first and the second authentication requester information is carried out, the security level can be improved further.

In the above-mentioned method for authenticating a user, it is preferable that the first communication device is a computer connected to the server device of the service provider via the Internet, the second communication device is a telephone, the first authentication requester information is a telephone number registered in advance in the server device by each service user, and the second authentication requester information is a telephone number of the second communication device, and the telephone number is obtained from a calling telephone number notification service provided by a telephone network.

In the above-mentioned method for authenticating a user, it is preferable that the first communication device is a computer connected to the server device of the service provider via the Internet, the second communication device is a telephone, the first authentication requester information is a user's name registered in advance in the server device by each service user, and the second authentication requester information is a user's name of the second communication device registered in a telephone company.

In the above-mentioned method for authenticating a user, it is preferable that the second authentication requester information is obtained by performing an inquiry to the user management device of the telephone company providing the second communication device based on the telephone number of the second communication device obtained by the calling telephone number notification service provided by the telephone network.

In the above-mentioned method for authenticating a user, it is preferable that when it is judged that the first authentication requester information agrees with the second authentication requester information, a toll of the service used by the service user is collected from the service user's bank account from which telephone charges are drawn.

In the above-mentioned method for authenticating a user, it is preferable that the server device of the service provider sends the confirmation information replied in the confirmation information issuing step to the user management device of the telephone company and allows the user management device of the telephone company to execute the authentication step.

In the above-mentioned method for authenticating a user, it is preferable that the first communication device is a computer connected to the server device of the service provider via the Internet, and the second communication device is a telephone, the method further includes, in the authentication step after it is judged that the confirmation information replied to the first communication device agrees with the confirmation information sent from the service user by the second communication device, a step of receiving credit card information of the service user from the second communication device and charging the service user based on the received credit card information.

In the above-mentioned method for authenticating a user, it is preferable that the server device of the service provider sends the confirmation information replied in the confirmation information issuing step to the server device of a credit card company, and allowing the server device of the credit card company to execute the authentication step.

It is preferable that the above-mentioned method for authenticating a user further includes steps of obtaining a telephone number of the second communication device from the calling telephone number notification service provided by the telephone network; obtaining a user's name of the second communication device from the user management device of the telephone company based on the obtained telephoned number, and judging whether or not the user's name of the credit card obtained from the user management device of the credit card company agrees with the user's name of the second communication device obtained by the user management device of the telephone company.

In the above-mentioned method for authenticating a user, it is preferable that characters or numbers generated randomly or the combination thereof are used as the confirmation information.

Furthermore, in order to achieve the above-mentioned object, the authentication method of the present invention includes an external connection unit for receiving an authentication request from a first communication device of a service user, a confirmation information generating unit for generating confirmation information to be replied to the first communication device, a confirmation information storage unit for storing the confirmation information replied to the first communication device, a confirmation information receiving unit for receiving the confirmation information sent by the service user from the second communication device using a communication path that is different from a communication path of the first communication device, and an authentication unit for judging whether or not the confirmation information received by the confirmation information receiving unit agrees with the confirmation information stored in the confirmation information storing unit.

It is preferable that the authentication device further includes a first authentication requester information obtaining unit for obtaining a first authentication requester information about a service user who makes the authentication request based on the information contained in the authentication request received from the first communication device; and a second authentication requester information obtaining unit for obtaining the second authentication requester information about the service user when receiving the confirmation information from the second communication device, wherein the authentication unit also judges whether or not the first authentication requester information agrees with the second authentication requester information.

In the above-mentioned authentication device, it is preferable that the first communication device is a computer connected to the server device of the service provider via the Internet, and the second communication device is a telephone; the user authentication device further includes a first authentication requester information registering unit for storing a telephone number of the telephone used by each service user as the second communication device as the first authentication requester information; and the second authentication requester information is a telephone number of the second communication device, and the second authentication requester information obtaining unit obtains the second authentication requester information from a calling telephone number notification service provided by a telephone network.

In the above-mentioned authentication device, it is preferable that the first communication device is a computer connected to the server device of the service provider via the Internet, and the second communication device is a telephone; the user authentication device further includes a first authentication requester information registering unit for storing a name of each service user as the first authentication requester information, the second authentication requester information is the name of the user of the second communication device registered in the telephone company, and the second authentication requester information obtaining unit obtains the user's name from the user management device of the telephone company.

In the above-mentioned authentication device, it is preferable that the second authentication requester information obtaining unit obtains a telephone number of the second communication device from the calling telephone number notification service provided by the telephone network and performs inquiry to the user management device of the telephone company based on the obtained telephone number, thereby obtaining the second authentication requester information.

In the above-mentioned authentication device, it is preferable that the first communication device is a computer connected to the server device of the service provider via the Internet and the second communication device is a telephone; and the user authentication device further includes a credit information receiving unit for receiving credit card information of the service user from the second communication device, and a billing unit for charging the service user based on the credit card information received by the credit information receiving unit after it is judged that in the authentication step, the confirmation information replied to the first communication device agrees with the confirmation information sent from the service user by the second communication.

It is preferable that the above-mentioned authentication device further includes a telephone number obtaining unit for obtaining a telephone number of the second communication device from the calling telephone number notification service provided by the telephone network; and a user's name obtaining unit for obtaining the name of the user of the second communication device from the user management device of the telephone company based on the obtained telephone number, wherein the authentication unit judges whether or not the user's name of the credit card obtained from the user management device of the credit card company agrees with the user's name of the second communication device obtained from the user management device of the telephone company.

In the above-mentioned authentication device, it is preferable that characters or numbers generated randomly or the combination thereof are used as the confirmation information.

BEST MODE OF CARRYING OUT THE INVENTION

First Embodiment

Hereinafter, one embodiment of the present invention will be explained with reference to the drawings.

Herein, a SOHO (small office home office) user who works at home by connecting a home personal computer to a server of a company via a public line such as ISDN, etc. will be explained as an example. That is, in this example, the company is a service provider and the SOHO user is a service user.

Figure 1:
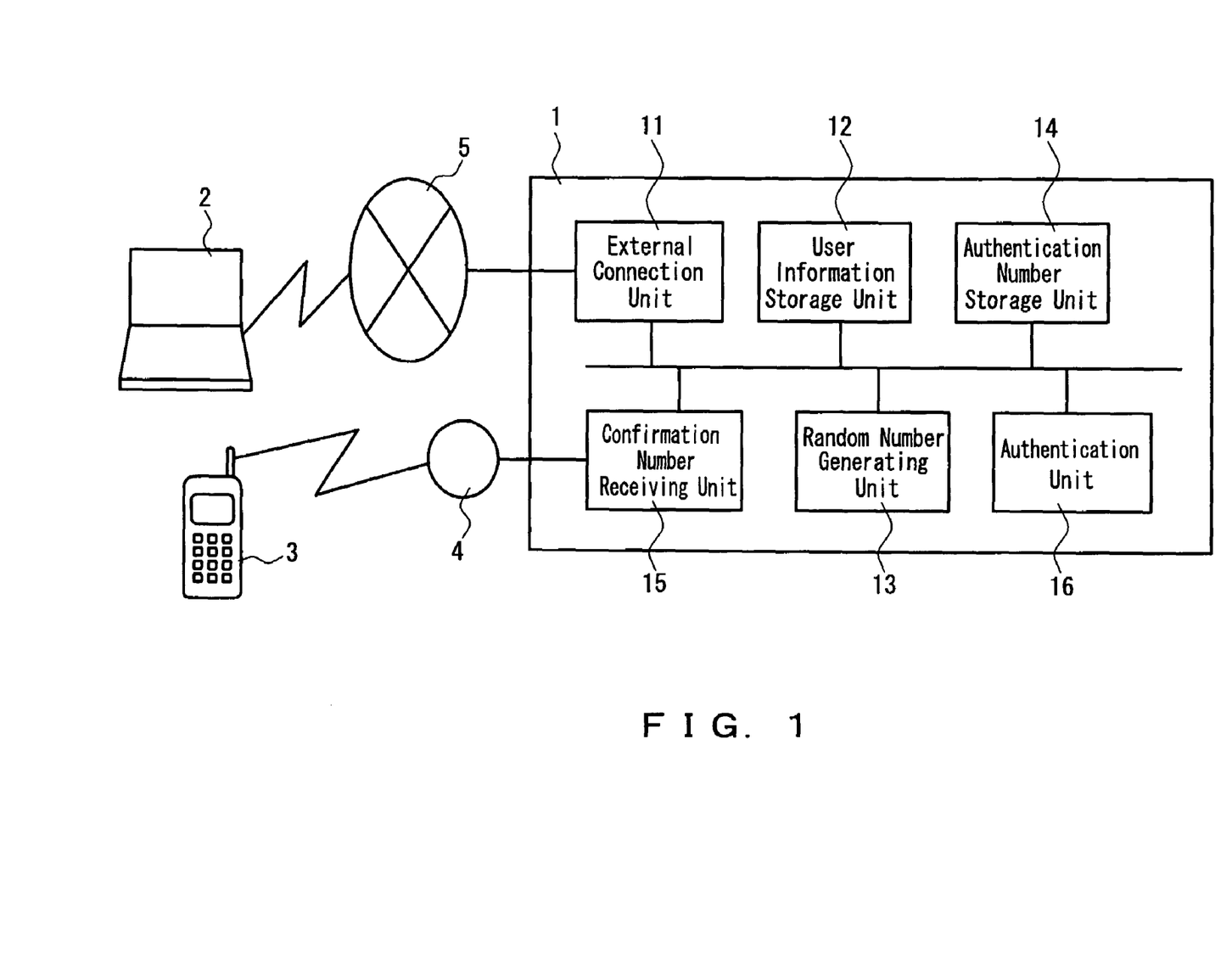
FIG. 1 is a block diagram showing a schematic configuration of a network system according to a first embodiment.

FIG. 1 is a block diagram showing a schematic configuration of a network system according to this embodiment. In FIG. 1, reference numeral 1 denotes a server of a LAN in an office of the company; 2 denotes a personal computer (first communication device) used by a user at home, etc.; 3 denotes a portable telephone (second communication device) of a user; and 4 denotes a modem for the server 1. The user accesses the server 1 of the office from the personal computer 2 via the Internet 5. Note here that a telephone network between the portable telephone 3 and the modem 4 is omitted in this drawing. Furthermore, LAN, etc. to which the server 1 is connected also is omitted in the drawing.

In order to make a connection to the system of the office, the user registers in advance a user number and password uniquely provided to each user, and a telephone number (herein, a telephone number of the portable telephone 3) for performing an authentication confirmation procedure in a user information storage unit 12 of the server 1 of the office.

Figure 2:
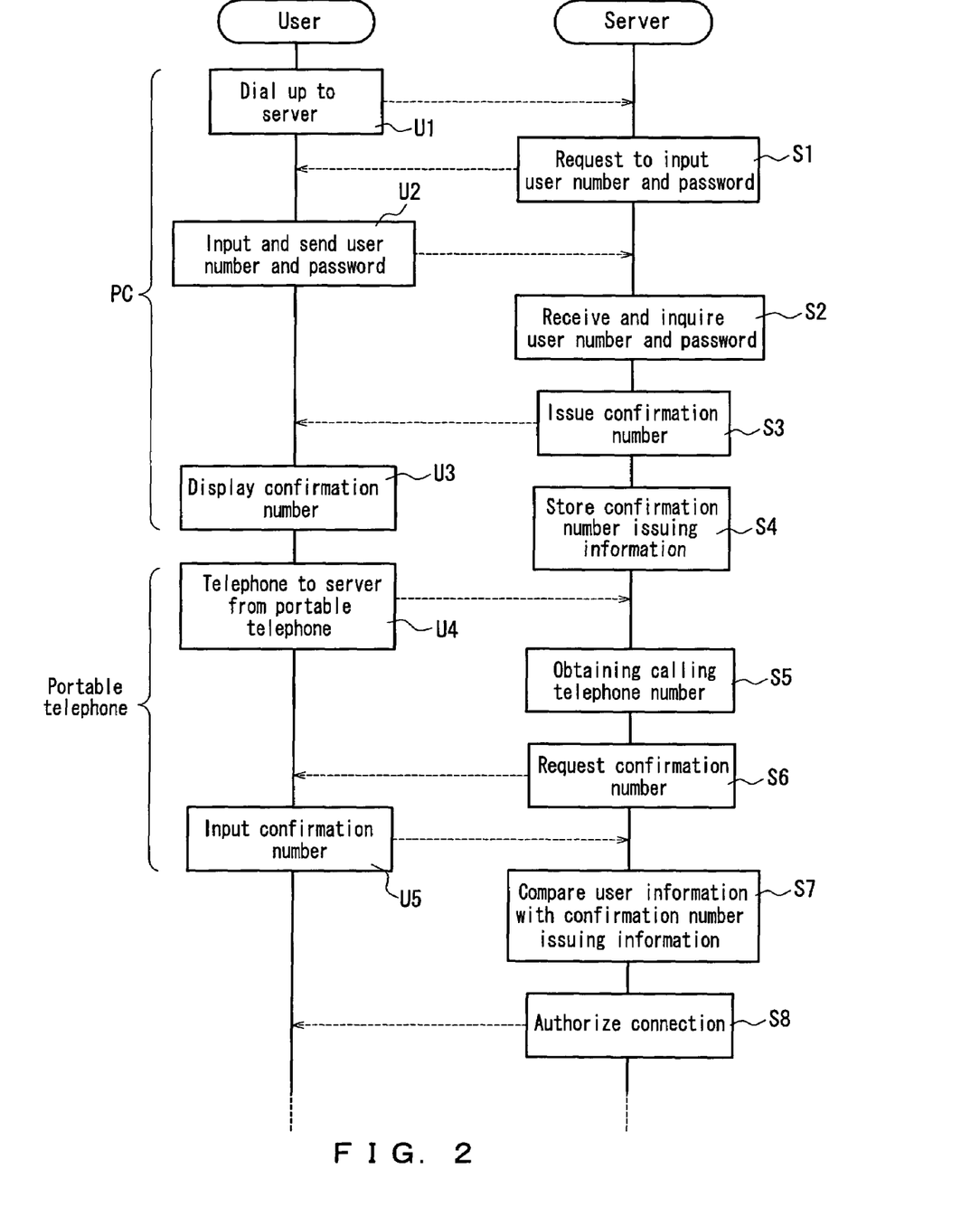
FIG. 2 is a flow chart showing a procedure in which a user receives an authentication for access from a home personal computer to a server in the network system according to the first embodiment.

Hereinafter, the procedure in which the user receives an authentication of access to the server 1 of the office from the home personal computer 2 will be explained with reference to a flowchart shown in FIG. 2.

A user starts up the home personal computer 2 and accesses the server 1 provided in the office via the Internet 5 (step U1). When a connection between the user's personal computer 2 and the server 1 is established, a request to input "user number" and "password" is sent from the server 1 to the user's personal computer 2 (step S1).

Figure 3:
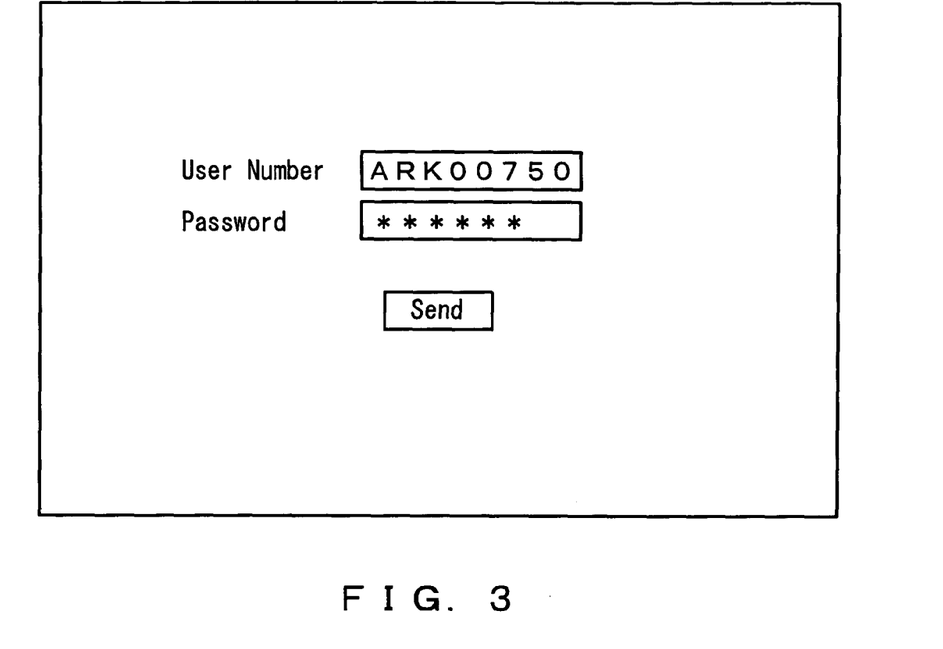
FIG. 3 shows an example of an input screen displayed on a user's personal computer in the network system according to the first embodiment.

At this time, as shown in FIG. 3, an input screen is displayed on a display of the personal computer 2, and the user inputs a user number ("ARK00750" in an example of FIG. 3) and a password in accordance with the request to input (step U2). Note here that the input password is displayed by asterisks, but herein it is assumed that "ADLN01" is input as a password. Then, when the user clicks a sending button displayed on the input screen, the user number and the password input by the user are sent from the personal computer 2 to the server 1.

In the server 1, an external connection unit 11 receives the user number and the password sent from the personal computer 2. Then, an authentication unit 16 inquires whether or not the user number and the password received by the external connection unit 11 agree with the user number and the password registered in a user information storage unit 12 in advance (step S2).

If it can be confirmed that the sent user number and password agree with the user number and password registered in advance, the authentication unit 16 allows a random number generating unit 13 (confirmation information generating unit) to generate random numbers and the random numbers are sent as a confirmation number (confirmation information) to the user's personal computer 2 (step S3). For example, the random numbers generated by the random generating unit 13 is, for example, "4756," and the confirmation number "4756" is sent to the user's personal computer 2.

Herein, the authentication unit 16 stores the user number "ARK00750" and password "ADLN01" received in the step S2, the confirmation number "4756" issued in the step S3, and the telephone number "090xxxxyyyy" for confirming the user's authentication number in a confirmation number storage unit 14 (confirmation information storage unit) as confirmation number issuing information (step S4). Note here that the telephone number for confirming the authentication number was registered in advance in the user information storage unit 12 by the user, and it is obtained from the user information storage unti 12 by the authentication unit 16 and stored in the confirmation number storage unit 14.

That is, in this embodiment, the telephone number of the portable telephone 3 is used as a first authentication requester information and the user information storage unit 12 plays a role of the first authentication requester information registering unit. Furthermore, as mentioned below, a telephone number obtained from a calling telephone number notification service is used as a second authentication requester information; and the authentication unit 16 functions as a first authentication requester information obtaining unit.

Figure 4:
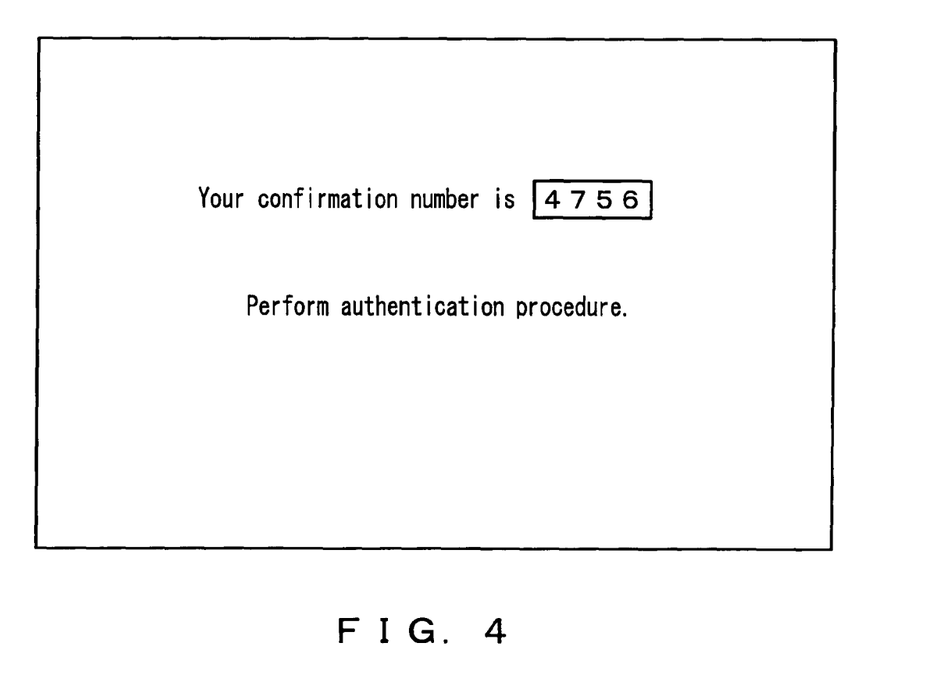
FIG. 4 shows an example of a display screen of the user's personal computer on which a confirmation number sent by a server is displayed according to a first embodiment.

When the user's personal computer 2 receives the confirmation number "4756" from the server 1, it displays the confirmation number "4756" on the screen as shown in FIG. 4 (step U3). The user telephones a telephone number designated in advance in order to access the confirmation number receiving unit 15 of the server 1 by using the portable telephone 3 (telephone number: 090xxxxyyyy) (step U4).

When the confirmation number receiving unit 15 of the server 1 responds to the telephone from the user, it obtains the telephone number of the caller's portable telephone 3 from the calling telephone number notification service provided by a telephone network (not shown) so as to be stored (step S5). That is, in this embodiment, the confirmation number receiving unit 15 functions as the second authentication requester information obtaining unit. Furthermore, the confirmation number receiving unit 15 sends a voice message such as "input the confirmation number replied from the server" to the portable telephone 3 (step S6).

Herein, the user inputs the confirmation number sent from the server 1 to the personal computer 2 as mentioned above by pushing key buttons "4," "7," "5," and "6" by using the keys of the portable telephone 3 (step U5).

When the confirmation number receiving unit 15 receives the confirmation number "4756" from the portable number 3, it sends the received confirmation number and the telephone number "090xxxxyyyy" of the portable telephone 3 obtained in the step S5 to the authentication unit 16 as the user information. Then, the authentication unit 16 compares the user information sent from the confirmation number receiving unit 15 with the confirmation number issuing information stored in the confirmation number storage unit 14 (step S7).

When the authentication unit 16 confirms that the user information (telephone number "090xxxxyyyy" and confirmation number "4756") obtained from the confirmation number receiving unit 15 agrees with the telephone number and the confirmation number stored in the confirmation number storage unit 14, respectively, it authenticates that the connection request via the user number (ARK00750) and the password (ADLN01) is sent from the user in person and authorizes the connection from the personal computer 2 to the server 1 (step S8). Thereafter, the user can use resources on the LAN in an office via the server 1.

In the above explanation, the example in which the connection authentication in the case of accessing the server of the office from the personal computer was explained. However, the present invention is not limited to this embodiment, and the same effect can be achieved in applying this embodiment to a banking operation on the Internet.

Furthermore, in the above mention, the case where a personal computer is employed as the first communication device used by a user and a portable telephone is employed as the second communication device is shown as an example, but the combination of the first and the second communication devices is not limited to this, and any combinations of communication devices can be applied as long as the communication device connects a user to a server via a communication path.

Furthermore, in the case where a user can use a plurality of channels that are physically in one line, like, for example, ISDN or xDSL, it is possible to make a connection request from a first communication device (for example, a personal computer) to a server via any one of channels and from a second communication device (for example, a telephone line) to a server via another channel.

Furthermore, in this embodiment, the confirmation number generated by the random number generating unit was used. However, besides this, a character string generated randomly or a combination of characters and numbers, and the like, can be used.

As mentioned above, according to this embodiment, the user need not carry a password generating device, etc. Furthermore, since the user exchanges information necessary to the connection authentication such as a password via a communication method that is not connected to the Internet, it is possible to prevent wrongdoing such as "pretending," etc. easily.

Furthermore, according to this embodiment, as the second authentication requester information, the user's telephone number is used and this telephone number is obtained from a calling telephone number notification service, making it difficult for the third person to pretend to be the user in person. Thus, it is possible to prevent the wrongdoing reliably.

Second Embodiment

Hereinafter, the second embodiment of the present invention will be explained.

Figure 5:
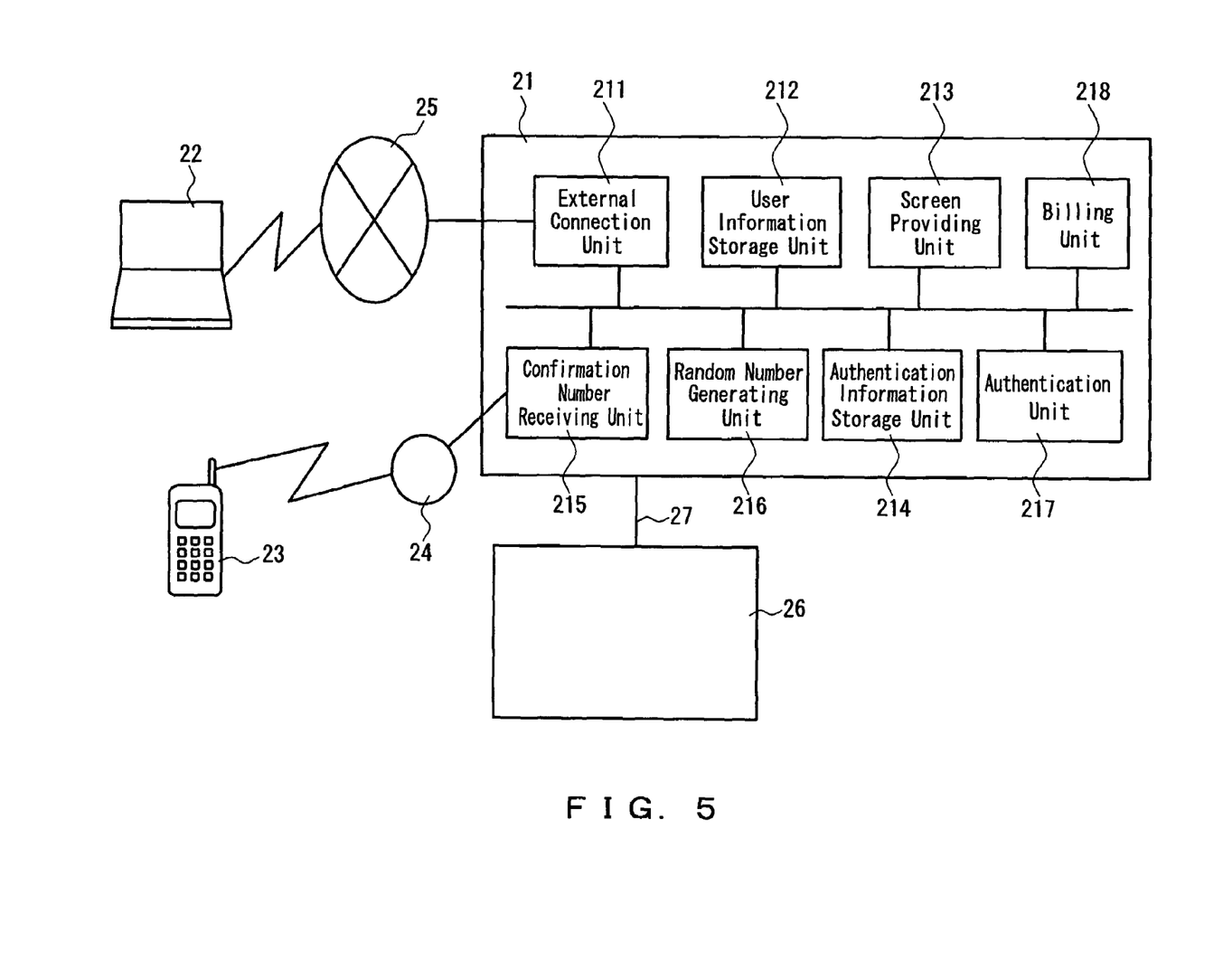
FIG. 5 is a block diagram showing a schematic configuration of an on-line shopping system according to a second embodiment.

FIG. 5 is a block diagram showing a schematic view showing an on-line shopping system according to this embodiment.

A service user accesses a homepage of a service provider running a shopping site from a terminal device 22 via the Internet 5. This homepage is provided by a server 21 of the service provider. Note here that a service user registers in advance user information such as name, address and E-mail address, etc. in a user information storage unit 212 (first authentication requester information registering unit) of the server 21.

Figure 6:
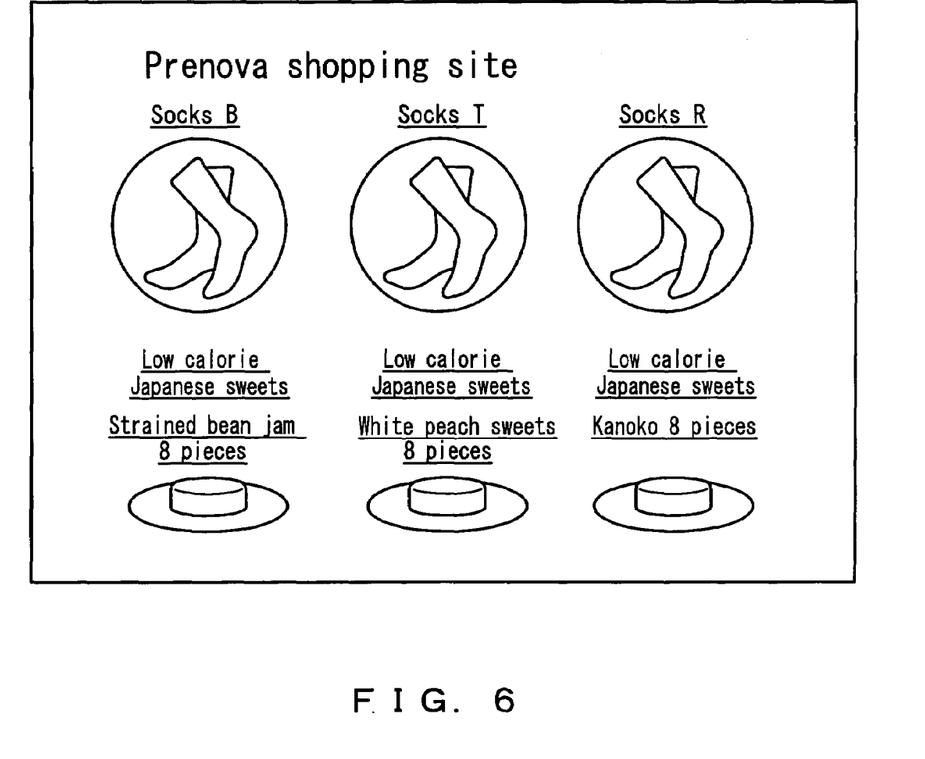
FIG. 6 is a merchandise list provided from a shopping site to a user's terminal device in the on-line shipping system according to the second embodiment.

The user browses the shopping site to look for merchandise. FIG. 6 is an example of a screen (screen of a merchandise list) of the shopping site displayed on the user's terminal device 22. This screen of a merchandise list and each of the below-mentioned screens are provided by a screen providing unit 213 of the server 21 to the terminal device 22 in, for example, HTML or XML, etc. in accordance with a click operation, etc. by a user.

In the case where the user intends to purchase, for example, "low calorie Japanese sweets, strained bean jam (8 pieces)," the user clicks a letter part of "low calorie Japanese sweets, strained bean jam (8 pieces)" on the display screen. Thus, the screen is changed into a screen for purchasing merchandise of "low calorie Japanese sweets, strained bean jam (8 pieces)" in FIG. 7. In this screen, the user inputs the purchasing number of "low calorie Japanese sweets, strained bean jam (8 pieces)." In an example shown in FIG. 7, "1" is input by the user in a number inputting box. After inputting the purchasing number of merchandise, the user clicks a letter part of "put in a shopping cart."

Figure 7:
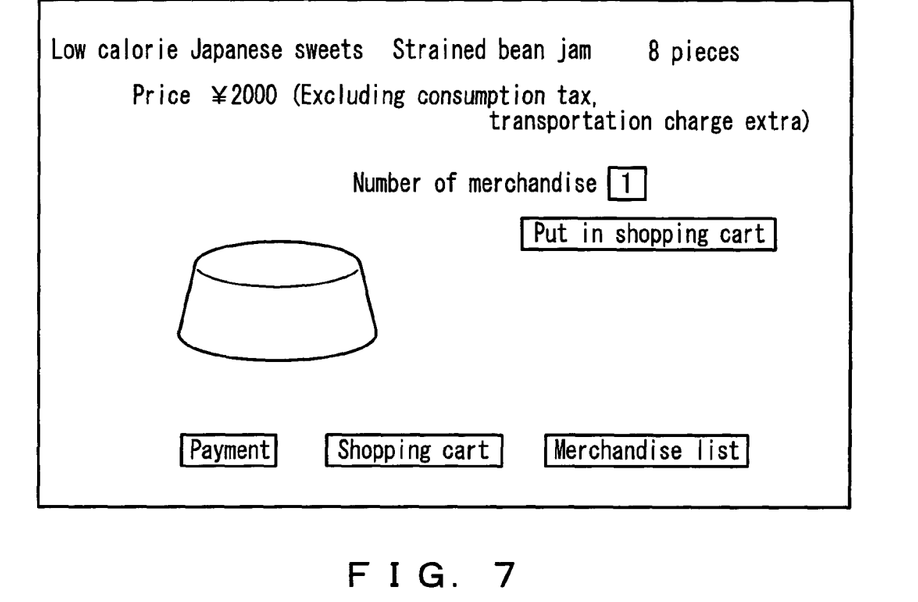
FIG. 7 is a screen for purchasing merchandise provided from the shopping site to the user's terminal device.

Furthermore, in the case where the other merchandise is purchased, by clicking the letter part of "merchandise list" on the screen in FIG. 7, the screen returns to the screen of the merchandise list shown in FIG. 6. Herein, the user clicks, for example, a letter part of "socks B" and then screen is shifted into the screen for purchasing merchandise of "socks B" similar to mentioned above. Then, the user sets the purchasing number and clicks the letter part "put in a shopping cart."

Figure 8:
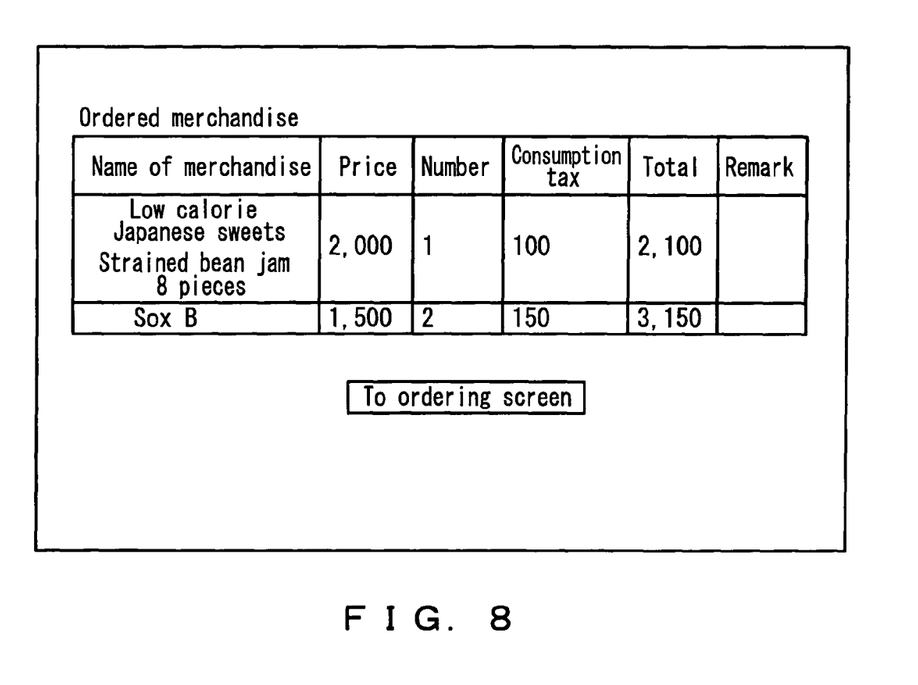
FIG. 8 is a screen for confirming the purchasing merchandise provided from the shopping site to the user's terminal device.

When the user clicks "shopping cart" on the lower part of the screen for purchasing merchandise in FIG. 7, the screen is shifted to a screen for confirming the purchasing merchandise. In this screen, the user confirms that the merchandise put in the shopping cart is certainly one box of "low calories Japanese sweets, strained bean jam (8 pieces)" and two pairs of "socks B," and in the case of ordering these items, the user clicks the letter "To ordering screen" in the lower part of the screen for confirming the purchasing merchandise. Thus, the display screen of the terminal device 22 is shifted to the ordering screen shown in FIG. 9. Note here that price, etc. shown in FIG. 8 or 9 is calculated by a billing unit 218 of the server 21.

Figure 9:
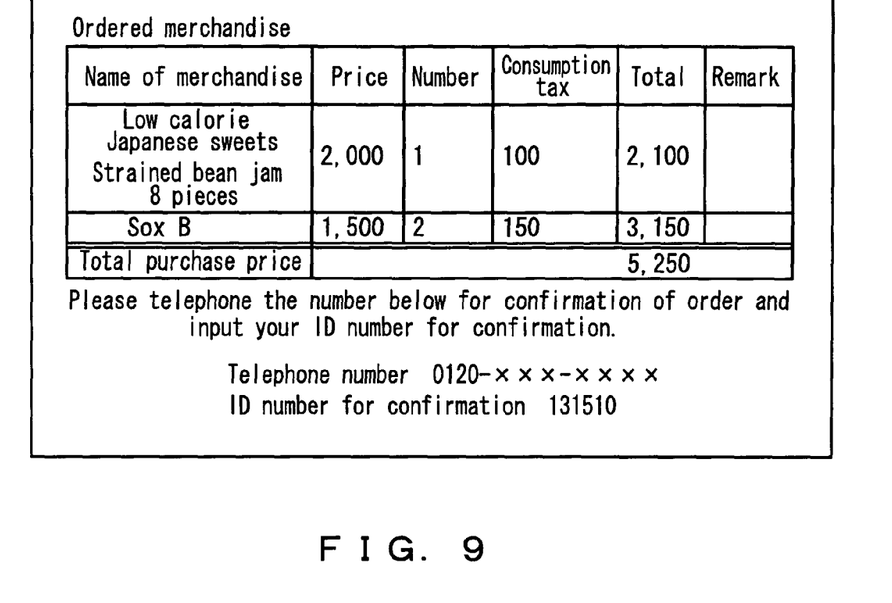
FIG. 9 is an ordering screen provided from the shopping site to the user's terminal device.

As shown in FIG. 9, in the upper part of the ordering screen, the purchasing merchandise information is displayed, and in the lower part of the screen, the letter "Please telephone the number below for confirmation of order and input your ID number for confirmation" and the telephone number and the ID number for confirmation are displayed. This ID number for confirmation is determined by allowing a random number generating part 216 to generate random numbers and is sent to the user's terminal device 22 together with the telephone number for confirming the ID number. Furthermore, the ID number for confirmation is stored in an authentication information storage part 214 in the server 21 together with the name of the user who sends the ID number for confirmation (first authentication requester information), or together with information (for example, E-mail address, user's ID etc. used for accessing the shopping site) that can be used as a retrieving key for identifying a user's name from the data stored in the user information storage unit 212. Note here that the telephone number for confirming ID number is a telephone number of a modem 24 connected to the server 21.

The user telephones the number displayed on the ordering screen by using the portable telephone 23. When the server 21 receives a telephone call from the portable telephone 23 by the modem 24, it obtains and stores the telephone number of the portable telephone 23 from a calling telephone number notification service provided by a telephone network (not shown). When the telephone is connected to the server 21, the user inputs the ID number for confirmation displayed on the screen of the terminal device 22 from the keys of the portable telephone 23.

Note here that as shown in FIG. 5, the server 21 of the service provider is connected also to a server 26 (user management device) of a telephone company via a private line 27. Note here that the private line 27 is used only for the communication between the server 21 and the server 26 and no one can access the server 26 from, for example, the terminal device 22, etc. via the server 21. The authentication unit 217 of the server 21 accesses the server 26 via this private line 27 and obtains the "user's name (second authentication requester information obtaining unit)" and "address" of the portable telephone as the user information of the portable telephone 23.

Figure 10:
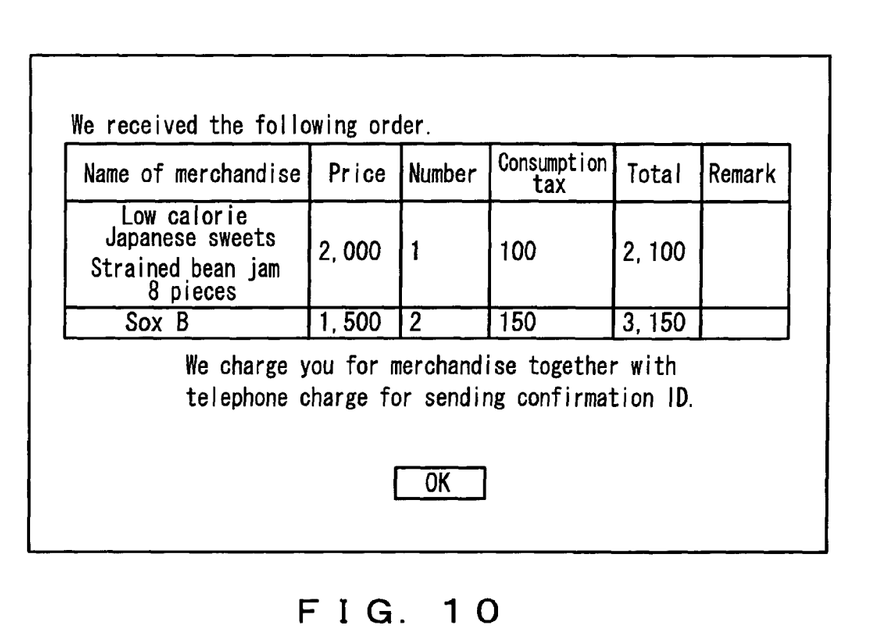
FIG. 10 is a screen for a final confirmation provided from the shopping site to the user's terminal device.

Furthermore, the server 21 identifies the user corresponding to the ID number for confirmation by referring to the authentication information storage part 214 (if necessary, the user information storage unit 212) based on the ID number for confirmation sent from the portable telephone 23, and if the "user's name" which the user has registered in the user information storage unit 212 agrees with the "user's name" of the portable telephone 23 that the authentication unit 217 obtains from the server 26 of the telephone company, the server 21 displays a final confirmation screen as shown in FIG. 10 in the user's terminal device 22. Herein, the user information sent from the server 21 of the service provider to the terminal device 22 is only the user's family name. Thus, as shown in FIG. 10, since the user's name is displayed as an addressee's name on the left upper part of the final confirmation screen, the user can confirm that the user in person is recognized as a purchaser correctly. Furthermore, by sending only the family name from the server 21 to the terminal device 22, it is possible to minimize the individual information appearing on the Internet, thus enabling the security to be improved.

The user confirms a display "We charge you for merchandise together with telephone charge for sending confirmation ID." on this final confirmation screen and clicks an "OK" button. Thus, the ordering of merchandise performed from the terminal device 22 to the server 21 is established.

When the server 21 of the service provider receives the confirmed order of merchandise, it requests a distribution system (not shown in the drawing) to ship the ordered merchandise. Furthermore, the billing unit 218 of the server 21 sends information such as a purchase price of the merchandise to the server 26 of the telephone company via the private line 27 so that the telephone company can draw the purchase price of the merchandise from a bank account that the user has registered as an payment account for the telephone charge. The telephone company draws the price of merchandise purchased on the shopping site of the server 21 together with the toll of the portable telephone from the user's bank account for the portable telephone 23.

In this embodiment, the case where the merchandise is purchased at one shopping site was explained. However, when merchandise is purchased at a plurality of shopping sites, by issuing ID for confirmation at each shopping site, the intention to purchase may be confirmed at each shopping site.

Furthermore, in the above-mentioned example, the user sends the ID number for confirmation, which was sent from the server 21, to the server 21 by using the portable telephone 23. However, besides this example, it may be possible to authenticate a user by the following methods. That is, the server 21 uses the telephone number of the modem of the server 26 of the telephone company instead of the server 21 of the shopping site as the telephone number for confirming ID number sent to the user's terminal device 22 together with the ID number for confirmation. Furthermore, the server 21 sends the ID number for confirmation determined by the random number generating unit 216 to the user and also to the server 26 of the telephone company together with the user's name. Then, the user sends the ID number for confirmation sent by the server 21 to the server 26 of the telephone company via the portable telephone 23. Then, the server 26 of the telephone company checks the name that is registered as a user of the portable telephone 23 with the user's name sent from the server 21 together with the confirmation ID number based on the received telephone number of the portable telephone 23, thereby confirming whether or not the user is a real person. Note here that in the case where the authentication of the user is performed by this method, the configuration corresponding to the authentication storage unit 214 and the authentication unit 217 of the server 21 is necessary for the side of the server 26.

As mentioned above, according to the on-line shopping system of this embodiment, since the user need not input a credit card number or personal identification code, the user can make a payment by a easy procedure. Furthermore, since the credit card number or identification code does not appear on the Internet, these secret data are not known to the third person, thus enabling high safety to be secured.

Note here that this embodiment employs the configuration in which the server 21 is connected to the server 26 via the private line 27. However, since data exchanged between the server 21 and the server 26 include the user's telephone number of the portable telephone and the name and address of the user of the telephone number, the secrecy degree may be thought to be lower as compared with data such as credit card number or its identification code which may cause a monetary damage if they are known to a malicious third person. In such a case, it is not necessary to use a private line, for example, the server 21 may be connected to the server 26 via a public line and the data are exchanged in a state in which they are encoded.

Third Embodiment

Figure 11:
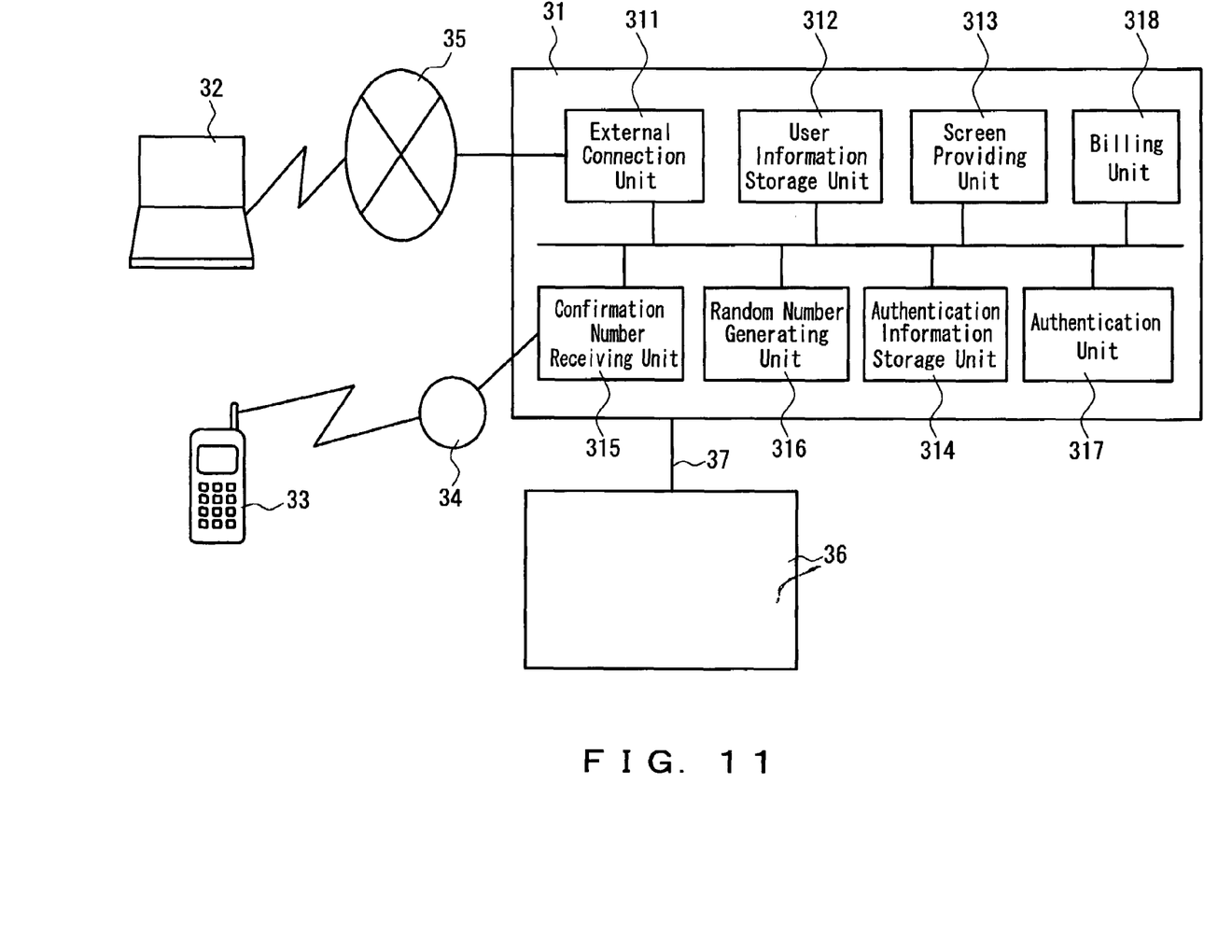
FIG. 11 is a block diagram showing a schematic configuration of an on-line shipping system according to a third embodiment.

FIG. 11 is a block diagram showing a configuration of an on-line shopping system according to a third embodiment of the present invention. In FIG. 11, reference numeral 31 denotes a server of a service provider of a shopping site; 32 denotes a terminal device of a service user; 33 denotes a portable telephone; 34 denotes a modem of the server 31; and 35 denotes the Internet. The on-line shopping system according to this embodiment is different from the on-line shopping system according to the second embodiment in that the server 31 of the shopping site is connected to a server 36 of a credit card issuing company.

The service user accesses the shopping site of the server 31 from the terminal device 32 via the Internet 35. Note here that the service user registers in advance the user information such as a name, address and E-mail address, etc. in the user information storage unit 312 of the server 31.

The user browses the shopping site to look for merchandise. That is, as in the second embodiment, the user selects merchandise to purchase from the merchandise displayed on the screen of a merchandise list as shown in FIG. 6 and puts it into a shopping cart.

After selection of the merchandise, the user clicks "shopping cart" in the lower part of the screen for purchasing merchandise as shown in FIG. 7 and the screen is shifted into a screen for confirming the purchase merchandise as shown in FIG. 8. Herein, the user confirms the merchandise put in the shopping cart and in the case of ordering these merchandise, the user clicks "To ordering screen" in the lower part of the screen for confirming the purchasing merchandise. Thus, the display screen of the terminal device 32 is shifted to the ordering screen shown in FIG. 9. Note here that the price, etc. shown in the display screen of FIG. 8 or 9 is calculated by a billing unit 318 of the server 31.

As shown in FIG. 9, in the upper part of the ordering screen, the purchasing merchandise information is displayed, and in the lower part of the screen, the letter "Please telephone the number below for confirmation of order and input your ID number for confirmation" and the telephone number and the ID number for confirmation are displayed. This ID number for confirmation is determined by allowing a random number generating part 316 to generate random numbers and is sent to the user's terminal device 32 together with the telephone number for confirming the ID number. Furthermore, the ID number for confirmation is stored also in an authentication information storage unit 314 in the server 31. Note here that the telephone number for confirming the ID number is a telephone number of the modem 34 connected to the server 31.

The user telephones the number displayed on the ordering screen by using the portable telephone 33. When the server 31 receives a telephone call from the portable telephone 33 by the modem 34, it obtains the telephone number of the portable telephone 33 from a calling telephone number notification service provided by a telephone network (not shown) and stores the obtained telephone number in the authentication information storage unit 314. When the telephone is connected to the server 31, the user inputs the ID number for confirmation displayed on the screen of the terminal device 32 by using keys of the portable telephone 33.

The server 31 of the service provider confirms the content of the purchasing merchandise based on the input ID number for confirmation. Furthermore, the server 31 replays a voice message for requesting to input the credit card number and identification code like "Input your credit card number. After inputting the credit card number, push a # (sharp) key. Next, input your identification code. After inputting the identification code, push a # (sharp) key." to the portable telephone 33 via the modem 34. The user inputs the credit card number and the identification code from the portable telephone 33 in accordance with the voice message. These input data are sent to a credit information receiving unit 315 of the server 31 via the modem 34.

The authentication unit 317 of the server 31 inquires the credit card number and identification code received in the credit information receiving unit 315 for the server 36 of the credit card issuing company (user management device). When there is no problem, the authentication unit 317 requests the portable telephone 33 to input the purchase price with by a voice message: "Input the purchase price. After inputting the purchase price, push a # (sharp) key."

Herein, the user inputs the total purchase price shown in the ordering screen (see FIG. 9) displayed on the terminal device 32 from keys of the portable telephone 33. In the server 31 of the service provider, the billing unit 318 checks the price input from the portable telephone 33 with the price of the purchasing merchandise information, and if the prices agree with each other, the server 31 sends a voice message like "Total price of the merchandise you have purchased is 5150 yen. We would charge it to your designated credit card" to the portable telephone 33 via the modem 34 and terminates the call.

The server 31 of the service provider indicates a distribution system (not shown in the drawing) to ship the ordered merchandise. Furthermore, the billing unit 318 of the server 31 sends a bill for the purchased merchandise with respect to the credit card designated by the user to the server 36 of the credit card issuing company.

In this embodiment, the inquiry was carried out by using only the credit card number and identification code. However, the server of the telephone company is connected to the server 31 of the service provider as in the second embodiment, and the authentication unit 317 inquires the name of the member of the credit card and the name of the holder of the telephone that sent the ID number for confirmation to confirm whether or not the both agree with each other, thus enabling the authentication of the user to be performed with higher certainty.

Furthermore, in this embodiment, the confirmation information such as an ID number for confirmation and credit card number, etc. were sent from the portable telephone 33 to the server 31, however, as explained in the second embodiment, these confirmation information and purchase price may directly be sent by the user from the portable telephone 33 to the server 36.

Thus, according to this embodiment, the user need not input the credit card number or identification code into the terminal device connected to the Internet, it is possible to carry out a shopping on the Internet safely while maintaining the high security. Furthermore, since the servers for exchanging the data such as credit card number of identification code are connected via the private line, these secret data are not known to the third person, thus enabling high safety to be secured.

INDUSTRIAL APPLICABILITY

According to the present invention, since the exchanging of the secret data such as password between the user and the server is performed by using the communication means other than the Internet, it is possible to provide an on-line system capable of preventing the wrongdoing such as pretending in a simple way.

The invention claimed is:

1. A method for authenticating a user by which a server device of a service provider authenticates a service user on a network, the method comprising:
    a confirmation information issuing step including receiving an authentication request from a first communication device of the service user, and then generating a confirmation information to be replied to the first communication device;
    an authentication step of judging whether or not the confirmation information replied to the first communication device agrees with the confirmation information sent from the service user by a second communication device using a communication path that is different from a communication path of the first communication device;
    obtaining first authentication requester information about a service user who makes the authentication request based on information contained in the authentication request received from the first communication device; and
    obtaining second authentication requester information about the service user when receiving confirmation information from the second communication device and judging whether or not the first authentication requester information agrees with the second authentication requester information,
    wherein the first communication device is a computer connected to the server device of the service provider via Internet,
    the second communication device is a telephone,
    the first authentication requester information is a user's name registered in advance in the server device by each service user, and
    the second authentication requester information is a user's name of the second communication device registered in a telephone company,
    wherein the second authentication requester information is obtained by performing an inquiry to a user management device of the telephone company providing the second communication device based on a telephone number of the second communication device obtained by a calling telephone number notification service provided by a telephone network.

2. The method for authenticating a user according to claim 1, wherein when it is judged that the first authentication requester information agrees with the second authentication requester information, a toll of a service used by the service user is collected from a service user's bank account from which telephone charges are drawn.

3. The method for authenticating a user according to claim 2, wherein the server device of the service provider sends the confirmation information replied in the confirmation information issuing step to a user management device of the telephone company and allows the user management device of the telephone company to execute the authentication step.

4. The method for authenticating a user according to claim 1, the method further comprising, in the authentication step after it is judged that the confirmation information replied to the first communication device agrees with the confirmation information sent from the service user by the second communication device, a step of receiving credit card information of the service user from the second communication device and charging the service user based on the received credit card information.

5. A method for authenticating a user by which a server device of a service provider authenticates a service user on a network, the method comprising:
    a confirmation information issuing step including receiving an authentication recquest from a first communication device of the service user, and then generating a confirmation information to be replied to the first communication device;
    an authentication step of judging whether or not the confirmation information replied to the first communication device agrees with the confirmation information sent from the service user by a second communication device using a communication path that is different from a communication path of the first communication device;
    in the authentication step after it is judged that the confirmation information replied to the first communication device agrees with the confirmation information sent from the service user by the second communication device, receiving credit card information of the service user from the second communication device and charging the service user based on the received credit card information;
    obtaining a telephone number of the second communication device from a calling telephone number notification service provided by a telephone network;
    obtaining a user's name of the second communication device from a user management device of a telephone company based on the obtained telephoned number; and
    judging whether or not a user's name of the credit card obtained from the user management device of the credit card company agrees with a user's name of the second communication device obtained by the user management device of the telephone company,
    wherein the first communication device is a computer connected to the server device of the service provider via Internet, and the second communication device is a telephone.

6. An authentication device comprising:
    an external connection unit for receiving an authentication request from a first communication device of a service user,
    a confirmation information generating unit for generating confirmation information to be replied to the first communication device,
    a confirmation information storage unit for storing the confirmation information replied to the first communication device,
    a confirmation information receiving unit for receiving the confirmation information sent by the service user from a second communication device using a communication path that is different from a communication path of the first communication device,
    an authentication unit for juduing whether or not the confirmation information received by the confirmation information receiving unit agrees with the confirmation information stored in the confirmation information storing unit, a first authentication requester information obtaining unit for obtaining a first authentication requester information about the service user who makes the authentication request based on the information contained in the authentication request received from the first communication device, a second authentication requester information obtaining unit for obtaining a second authentication requester information about the service user when receiving the confirmation information from the second communication device, a first authentication requester information registering unit for storing a name of each service user as the first authentication requester information, and the second authentication requester information is the name of the user of the second communication device registered in a telephone company, and the second authentication requester information obtaining unit obtains a user's name from the user management device of the telephone company, wherein the authentication unit also judges whether or not the first authentication requester information agrees with the second authentication requester information;

wherein the first communication device is a computer connected to a server device of a service provider via Internet, and the second communication device is a telephone; and wherein the second authentication requester information obtaining unit obtains a telephone number of the second communication device from a calling telephone number notification service provided by a telephone network and performs inquiry to the user management device of the telephone company based on the obtained telephone number, thereby obtaining the second authentication requester information.

7. The user authentication device according to claim 6, the user authentication device further comprising:

a credit information receiving unit for receiving credit card information of the service user from the second communication device, and a billing unit for charging the service user based on the credit card information received by the credit information receiving unit after it is judged that, in the authentication step, the confirmation information replied to the first communication device agrees with the confirmation information sent from the service user by the second communication.

8. An authentication device comprising:

an external connection unit for receiving an authentication request from a first communication device of a service user, a confirmation information generating unit for generating confirmation information to be replied to the first communication device, a confirmation information storage unit for storing the confirmation information replied to the first communication device, a confirmation information receiving unit for receiving the confirmation information sent by the service user from a second communication device using a communication path that is different from a communication path of the first communication device, an authentication unit for judging whether or not the confirmation information received by the confirmation information receiving unit agrees with the confirmation information stored in the confirmation information storing unit, a credit information receiving unit for receiving credit card information of the service user from the second communication device, a billing unit for charging the service user based on the credit card information received by the credit information receiving unit after it is judged that, in the authentication step, the confirmation information replied to the first communication device agrees with the confirmation information sent from the service user by the second communication, a telephone number obtaining unit for obtaining a telephone number of the second communication device from a calling telephone number notification service provided by a telephone network, and a user's name obtaining unit for obtaining a name of the user of the second communication device from a user management device of a telephone company based on the obtained telephone number, wherein the first communication device is a computer connected to a server device of a service provider via Internet and the second communication device is a telephone; and wherein the authentication unit judges whether or not the user's name of the credit card obtained from the user management device of a credit card company agrees with the user's name of the second communication device obtained from the user management device of the telephone company.

* * * * *